United States Patent [19]
Bergman, Jr. et al.

[11] 3,721,831
[45] March 20, 1973

[54] OPTICAL SECOND HARMONIC GENERATORS EMPLOYING THIOCYANATE CRYSTALS

[75] Inventors: John George Bergman, Jr., Rumson; Glen Robert Crane, Scotch Plains; James Hoffman McFee, Colts Neck, all of N.J.

[73] Assignee: Bell Telephone Laboratories, Incorporated, Murray Hill, N.J.

[22] Filed: July 16, 1971

[21] Appl. No.: 163,321

[52] U.S. Cl. ............................... 307/88.3, 321/69 R
[51] Int. Cl. ................................. H02m 5/06
[58] Field of Search ..................... 307/88.3; 321/69

*Primary Examiner*—Roy Lake
*Assistant Examiner*—Darwin R. Hostetter
*Attorney*—R. J. Guenther et al.

[57] ABSTRACT

The disclosed optical second harmonic generator uses a cadmium-mercury thiocyanate crystal or a zinc-mercury thiocyanate crystal. This device is advantageously pumped with a neodymium dielectric rod laser oscillating at 1.06 micrometers wavelength. The thiocyanate crystals possess about 30 percent larger nonlinear optical coefficient than the lithium iodate crystals employed in commercially available devices.

2 Claims, 1 Drawing Figure

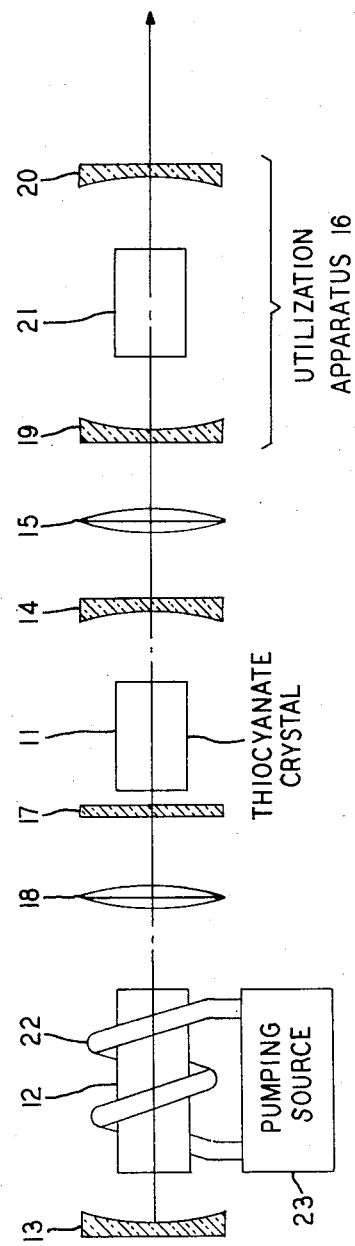

OPTICAL SECOND HARMONIC GENERATORS EMPLOYING THIOCYANATE CRYSTALS

BACKGROUND OF THE INVENTION

This invention relates to crystals for nonlinear optical devices and particularly optical second harmonic generators.

In general, the materials used for nonlinear optical applications are constructed of atoms which are connected only by single bonds. Good examples of such crystals are crystals of lithium iodate ($LiIO_3$) and lithium metaniobate ($LiNbO_3$). We have considered the possibility that by increasing the electron density along these bonds by using doubly or triply bonded atoms, one might increase the effective polarizability of the system and, thereby, the strength of the nonlinear optical effect. A classic example of an atom employing double bonds is the benzene ring ($C_6H_6$). The carbon atoms in such a molecule are bonded to only one-half as many hydrogen atoms or other noncarbon atoms as they might be if only single bonds were involved.

Nevertheless, for commercially desirable nonlinear optical applications and particularly for second harmonic generators, it is desirable to have a solid crystalline substance of the multiple-bond type employed as the nonlinear optical medium.

SUMMARY OF THE INVENTION

According to our invention, we have discovered that crystals of cadmium-mercury thiocyanate or zinc-mercury thiocyanate, grown typically from a water solution, provide surprisingly strong second harmonic generation. The effect is about thirty percent stronger than that of lithium iodate, which has proven to be the best currently available crystal for second harmonic generators and which is used in commercial devices.

BRIEF DESCRIPTION OF THE DRAWING

Further features and advantages of our invention will become apparent from the following detailed description, taken together with the drawing, in which the sole FIGURE is a partially pictorial and partially block diagrammatic illustration of a typical embodiment of our invention.

DETAILED DESCRIPTION OF ILLUSTRATIVE EMBODIMENT

In the drawing, a crystal 11 of cadmium-mercury thiocyanate or zinc-mercury thiocyanate is pumped by a neodymium dielectric rod laser 12 of conventional type operating at 1.06 micrometers and produces a second harmonic at 0.53 micrometers (5,300 Angstrom units) which is extracted through the partially transmissive reflector 14 of the optical resonator and focused into the utilization apparatus 16 by a lens 15. The utilization apparatus 16 is illustratively a parametric oscillator including a lithium metaniobate crystal 21 which is heated to about 120° C., by means not shown, to avoid optical damage at the 5,300 Angstrom wavelength. Such parametric oscillators are now well known in the art.

The optical resonator for the pump laser 12 is completed by the back reflector 13. The dichroic reflector 17 is transmissive to the pump wavelength and reflective at the second harmonic wavelength, thereby forming a second harmonic resonator with the partially transmissive harmonic reflector 14. Reflector 14 can also be made dichroic in the respect that it can be made totally reflective at the pump wavelength and only partially transmissive at the second harmonic wavelength. Typically, the pump light is focused into the crystal 11 by a lens 18 in order to provide optimum focusing in the crystal 11 according to the principles of the invention of issued U.S. Pat. No. 3,530,301 of G. D. Boyd et al., which issued Sept. 22, 1970.

The principal differences of the device of FIG. 1 from similar second harmonic generators and associated apparatus in the prior art is the choice of material of crystal 11 and its orientation to provide a strong nonlinear optical effect. For example, cadmium-mercury thiocyanate crystals approximately 5 millimeters on a side were grown by evaporation from an aqueous solution at 35° C. The crystals are transparent from about 0.4 micrometers to about 2.5 micrometers and have not been observed to suffer optically induced damage at any of several visible pumping wavelengths to which they have been subjected. The indices of refraction at 0.53 micrometers, as determined by the image displacement method, are $n^o \simeq 2$ and $n^e \simeq 1.8$. For the strongest nonlinear effect employing the $d_{31}$ second order nonlinear coefficient of cadmium-mercury thiocyanate, crystal 11 is oriented so that the pump light was propagated 35.4° to the optic axis of the material, the pump light being polarized along the 100 crystalline axis of the material, and the resulting second harmonic light is an extraordinary ray. It was found that this orientation of crystal 11 provides phase-matched second harmonic generation and collinear propagation of fundamental and harmonic beams.

In operation, the orientation of crystal 11 produces second harmonic generation which indicates that the nonlinear coefficient $d_{31}$ of cadmium-mercury thiocyanate is about $1.3 \pm 0.1$ times that of the best nonlinear coefficient, $d_{33}$, of lithium iodate.

While we do not wish to be bound by the following theory, we believe that our results are obtained by using material of high effective polarizability. To this end, we investigated materials including the thiocyanate ion (S=C=N, or S—C ≡ N). The particular salts selected have the added advantage of containing metals with filled $d$ shells (Group IIB of the periodic chart), which we believe should also enhance the effective polarizability.

Further details of the preparation of our crystals are as follows. The cadmium and zinc salts of tetrathiocyanatomercuate (II), specifically, $CdHg(SCN)_4$ and $ZnHg(SCN)_4$ were prepared by reacting stoichiometric amounts of sodium thiocyanate (NaSCN) with the appropriate metal nitrates. The resulting aqueous solution was heated to 70° C. and allowed to cool slowly to room temperature. As stated heretofore, the larger crystals for our experiments were thereafter grown by evaporation from an aqueous solution of the previously prepared salts at 35° C. It is also believed that these crystals can be grown with sufficient purity from alcohol solution or other organic solutions in very large size if grown sufficiently slowly.

Recent structural studies have shown the space group of the cadmium complex to be $I\bar{4}$ ($S_4^2$) with two formula units per unit cell of dimensions $a_o = 11.48 \pm$ 0.02A and $C_o = 4.33 \pm 0.02$A. The observed density is 3.06 gm/cm$^3$.

The scheme for the array of nonlinear coefficients subject to $\bar{4}$ symmetry is $$\begin{pmatrix} 0 & 0 & 0 & d_{14} & d_{15} & 0 \\ 0 & 0 & 0 & -d_{15} & d_{14} & 0 \\ d_{31} & -d_{31} & 0 & 0 & 0 & d_{36} \end{pmatrix}$$

Further relations among the coefficients, according to the so-called Kleinman symmetry conditions are $d_{14} = d_{32}$ and $d_{15} = d_{31}$. Hence, the components of the nonlinear polarization at the second harmonic wavelength in terms of the E fields at the fundamental wavelength are given by $P_x = 2d_{36}E_yE_z + 2d_{31}E_xE_z$
$P_y = -2d_{31}E_yE_x + 2d_{36}E_xE_z$
$P_z = d_{31}(E_x^2 - E_x^2) + 2d_{36}E_xE_y$.

The nonlinear coefficients $d_{31}$ and $d_{36}$ of CdHg(SCN)$_4$ were measured relative to $d_{33}$ of LiIO$_3$ by SHG experiments using a Q-switched Nd:YAG laser operating at 1.06$\mu$. Samples were prepared in the form of thin wedges, which when translated along the wedge direction gave fringes allowing the determination of the coefficients ($d_{31}$, $d_{36}$) as well as the coherence length $l_{31}$. Further results of our experiments are given in our joint paper in *Materials Research Bulletin*, 5, 913 (November, 1970).

W. Stürmer and U. Deserno at a recent meeting of the European Physical Society (July 24, 1970) have reported measuring $d_{31}${ CdHg(SCN)$_4$ } = (1.2±36) $d_{31}$(LiNbO$_{3c}$) under phase-matched conditions. Their result can be compared with our value in the following manner. Boyd et al. give $d_{31}$(LiNbO$_3$) = (10.6±1.0)$d_{36}$(KH$_2$PO$_4$)

hence Sturmer and Deserno's result can be stated as $d_{31}${CdHg(SCN)$_4$} = (12.7±5.1)$d_{36}$(KH$_2$PO$_4$).

Therefore, within these limits of error, the two values of $d_{31}$ are in agreement. See also their article in *Physics Letters*, 32A, 539 (September, 1970).

The degree to which the SCN ion contributes to the high index of refraction and hence the large nonlinear coefficient cannot be assessed at this time. In any event, we have shown cadmium-mercury thiocyanate and zinc-mercury thiocyanate to be phase-matchable nonlinear optical materials that do not suffer from optical damage and are competitive with lithium iodate.

It should be apparent that many modifications of the embodiment of FIG. 1 can be made. For example, the end surfaces of the crystal 11 can advantageously be antireflection coated in view of its high refractive index. Moreover, it is not necessary to employ the crystal 11 inside the pump resonator. It could very well be positioned in its own resonator, external to the pump resonator.

We claim:

1. An optical second harmonic generator of the type in which a transparent crystal having a substantial second order nonlinear coefficient is pumped by a fundamental optical beam to produce a second harmonic optical beam, said generator being characterized in that said crystal is a crystal of a metal-mercury thiocyanate compound.

2. A generator of the type claimed in claim 1, characterized in that said crystal is a crystal of cadmium-mercury thiocyanate, CdHg(SCN)$_4$.

* * * * *